United States Patent [19]

Maya

[11] Patent Number: 5,024,741

[45] Date of Patent: * Jun. 18, 1991

[54] HYBRID ISOTOPE SEPARATION SCHEME

[75] Inventor: Jakob Maya, Brookline, Mass.

[73] Assignee: GTE Products Corporation, Danvers, Mass.

[*] Notice: The portion of the term of this patent subsequent to Jun. 18, 2008 has been disclaimed.

[21] Appl. No.: 323,930

[22] Filed: Mar. 15, 1989

[51] Int. Cl.$^5$ .............................................. B01D 5/00
[52] U.S. Cl. ...................................... 204/157.22; 55/2; 55/17; 422/159; 422/903; 422/136; 422/186.3; 204/157.2; 494/900
[58] Field of Search ........... 204/157.2, 157.21, 157.22; 55/2, 17; 422/159, 903, 136, 186.3; 494/900

[56] References Cited

U.S. PATENT DOCUMENTS

| | | | |
|---|---|---|---|
| 2,536,423 | 1/1951 | Cohen et al. | 494/900 |
| 2,713,025 | 7/1955 | Billings | 204/157.21 |
| 2,876,949 | 3/1959 | Skarstrom | 494/900 |
| 3,501,091 | 3/1970 | Oyama | 494/900 |
| 3,673,406 | 6/1972 | Wief et al. | 250/374 |
| 3,774,376 | 11/1973 | Takashima et al. | 494/900 |
| 3,915,673 | 10/1975 | Tamai et al. | 55/17 |
| 3,983,019 | 9/1976 | Botter nee Bergheaud et al. | 204/157.21 |
| 3,996,120 | 12/1976 | Freund et al. | 204/157.22 |
| 3,998,610 | 12/1976 | Leith | 55/17 |
| 4,090,855 | 5/1978 | Hora et al. | 55/2 |
| 4,096,046 | 6/1978 | Niemann | 204/157.21 |
| 4,193,775 | 3/1980 | Wang | 55/17 |
| 4,235,612 | 11/1980 | Gazda | 55/403 |
| 4,255,404 | 3/1981 | Chen | 423/258 |
| 4,265,648 | 5/1981 | Wedege | 55/409 |
| 4,373,941 | 2/1983 | Lagelbauer | 55/401 |
| 4,514,363 | 4/1985 | Dubrin | 423/3 |
| 4,516,966 | 5/1985 | Alderton et al. | 55/17 |
| 4,648,951 | 3/1987 | Maya | 204/157.21 |
| 4,849,183 | 7/1989 | Kuriyama | 422/136 |

FOREIGN PATENT DOCUMENTS

| | | |
|---|---|---|
| 0064596 | 5/1977 | Japan. |
| 0064597 | 5/1977 | Japan. |
| 0064598 | 5/1977 | Japan. |
| 0037969 | 3/1979 | Japan. |

OTHER PUBLICATIONS

Donald R. Olander, "The Gas Centrifuge", (Scientific American, vol. 239, No. 2, Aug. 1978).

Primary Examiner—Edward A. Miller
Assistant Examiner—Ngoclan T. Mai
Attorney, Agent, or Firm—Martha Ann Finnegan

[57] ABSTRACT

A method of yielding selectively a desired enrichment in a specific isotope including the steps of inputting into a spinning chamber a gas from which a scavenger, radiating the gas with a wave length or frequency characteristic of the absorption of a particular isotope of the atomic or molecular gas, thereby inducing a photochemical reaction between the scavenger, and collecting the specific isotope-containing chemical by using a recombination surface or by a scooping apparatus.

22 Claims, 2 Drawing Sheets

HYBRID ISOTOPE SEPARATION SCHEME

The Government has rights in this invention pursuant to subcontract 4540710 under Prime Contract DE-AC03-76SF00098 awarded by the United States Department of Energy.

BACKGROUND OF THE INVENTION

1. Field of the Invention

The present invention relates to the separation of isotopes from a gaseous mixture by means of a rotary chamber such as, for example, a centrifuge reactor having means therein to radiate the gaseous mixture with a wave length or frequency characteristic of the absorption of a particular isotope of the atomic or molecular gaseous mixture so as to induce a photochemical reaction of the desired isotope.

2. Description of the Prior Art

The separation of isotopes by spinning highly volatile gas at fairly high speeds is known. Such separation is known in the art as the gas-centrifuge method. In the typical centrifuge reactor a gaseous compound is subjected to spinning at very high rotational speeds within a cylindrical rotor, causing the gas particles containing the heavier isotope to be thrust against the wall of the rotor. In particular, the rotation of the rotor drives the gas radially against the wall of the rotor such that a substantial portion of the center of the cylinder is under vacuum or close to it, even though no pump is employed. The gas particles tend to concentrate at the peripheral wall of the rotor. A weak vertical circulation is effected by, for example, providing a bottom scoop within the rotor which functions in combination with temperature differences at the top and bottom caps for the rotor to cause vertically axial movement of the gas at the peripheral wall of the rotor, in a known manner. A top scoop is also provided to scoop the desired particles.

The foregoing type of centrifuge reactor is well known in the art. Representative of such a reactor is discussed in an article entitled "The Gas Centrifuge" by Donald R. Olander, (*Scientific American*, Volume 239, No. 2, August 1978). The reactor discussed in the Olander article is particularly useful in enrichment by increasing the concentration of one isotope relative to another. The use of such a reactor is very economical, a large separation factor and sufficient throughput being provided. However, the scoop provided in a typical centrifuge reactor is of a finite size which means that it is usually not possible to scoop a single isotope from a distribution of isotopes that are enriched. Therefore, regardless of the favorable economics, in applications where only one of several isotopes is needed, centrifugal reactors heretofore in use have not been particularly useful.

Another known means for the separation of isotopes involves photochemical separation. Examples of photochemical separation can be found in U.S. Pat. Nos. 2,713,025 to Billings; 3,673,406 to Wief et al.; 3,983,019 to Botter nee Bergheaud et al.; 3,996,120 to Freund et al.; and 4,096,046 to Niemann. These patents are of interest in that they describe various apparatuses and methods for use in photochemical isotope separation using one form or another of a lamp for irradiation of a gas stream to effect the separation. The photochemical isotope separation process is known to be useful in those instances where photons from a particular radiation source excite only one isotope. The apparatus used in such a process is useful in obtaining a single isotope from a distribution of isotopes without substantially altering the composition of the other isotopes in the distribution. One disadvantage of such photochemical isotope separation is that due to deposits containing enriched material, eventually the entry window for the photons becomes foggy unless some means is provided to prevent such a buildup. A similar fogginess results from the use of a lamp if the envelope of the lamp is in contact with the chemical during the photochemical separation process. When the lamp envelope or entry window becomes foggy, it is necessary to stop the reactor or activate some form of scraper or the like to clean the envelope or window.

It is highly desirable to obtain a single isotope from a distribution of isotopes that are enriched. It is further desirable to provide a photochemical isotope separator which can be used to obtain a single isotope from a distribution of isotopes that are enriched, without causing anywhere in the apparatus a buildup of enriched material which might impede radiation.

SUMMARY OF THE INVENTION

The invention achieves these and other results by providing a method of yielding selectively a desired enrichment in a specific isotope comprising the steps of (a) inputting into a rotatable chamber a gaseous mixture including the specific isotope and a scavenger from which the specific isotope is to be isolated; (b) spinning the chamber and the gaseous mixture therein; (c) radiating the spinning gaseous mixture with a wavelength or frequency characteristic of the absorption of a particular isotope of the atomic or molecular gaseous mixture, thereby inducing a chemical reaction between the specific isotope and scavenger to form a scavenger compound, and (d) collecting the scavenger compound which includes the specific isotope from the spinning and radiated gaseous mixture.

As used herein, the term "scavenger" is used to describe a chemical species which reacts with the specific isotope when the specific isotope is in an excited state to form a scavenger compound which includes the specific isotope.

The scavenger compound formed in the present invention may advantageously be separated from the gaseous mixture as follows: (a) the scavenger compound which forms is a solid which readily separates from the gaseous mixture by depositing on the reactor wall; or (b) by virtue of the increased molecular mass of the scavenger compound over the unreacted specific isotope as described in greater detail herein below.

DESCRIPTION OF THE PREFERRED EMBODIMENT

Figure 1:
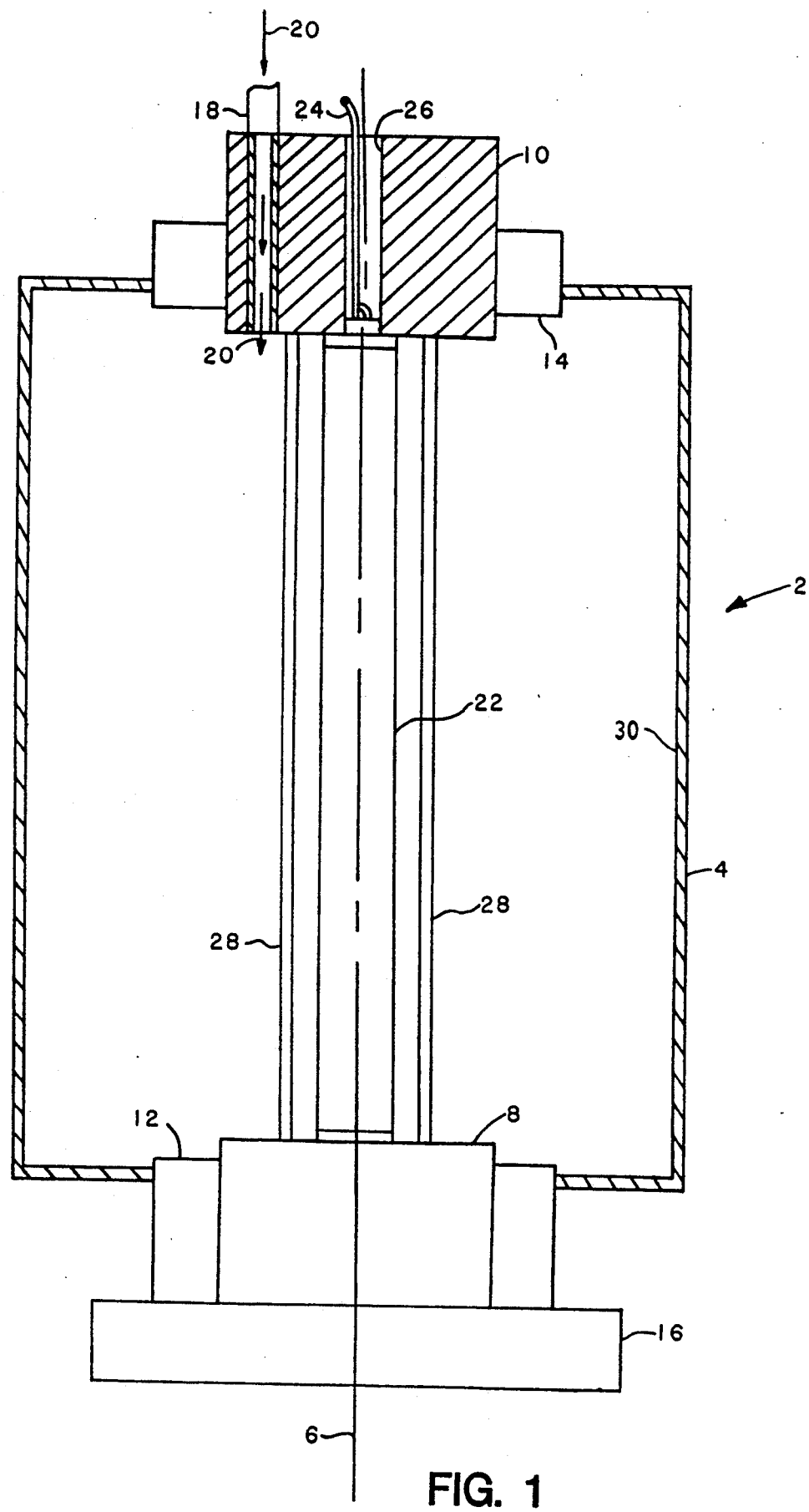
FIG. 1 is an elevational view of one embodiment of a photochemical isotope separator of the present invention.

The embodiment which is illustrated in FIG. 1 is particularly suited for achieving the objects of this invention. FIG. 1 depicts a photochemical isotope separator 2 such as, for example, a gas centrifuge. The separator 2 includes a chamber 4 which in the preferred embodiment is a cylindrical chamber. Chamber 4 has a longitudinal axis 6 about which the chamber can be rotated in a known manner. In particular, means is coupled to the chamber for spinning it at a high speed about axis 6. Such spinning means is known in the art relating to gas centrifuges and is therefore not discussed in detail herein. However, such spinning means is diagrammatically depicted in FIG. 1 as including supporting hubs 8 and 10 which are associated with magnetic bearings 12 and 14, hub 8 being supported by an electromagnetic motor 16 and hub 10 being supported by appropriate structure not depicted in the drawing. In the embodiment of FIG. 1, hubs 8 and 10 are stationary, although it is possible to provide a centrifuge wherein such hubs rotate with the chamber. Upon activation, electromagnetic motor 16 causes the chamber 4 to rotate at a high speed about hubs 8 and 10 and axis 6.

Means is provided for causing gas to flow into chamber 4. In particular, in the embodiment of FIG. 1 a conduit 18 extends through hub 10 such that gas supplied from a source (not depicted) will flow in the direction of arrows 20 into the chamber 4. The gas fed into the chamber 4 through conduit 18 is a gas from which a specific isotope is to be isolated as described herein. Such gas will be caused to spin as a result of the spinning of the chamber 4.

Means is mounted within the chamber for radiating the spinning gas with a wave length or frequency characteristic of the absorption of a particular isotope of the atomic or molecular gaseous mixture. Without limitation, examples of such radiating means include a laser, an isotopically selective lamp, and the like. In the embodiment of FIG. 1, radiating means is depicted as a lamp 22 which is isotopically selective. Lamp 22 is an elongated fluorescent lamp which extends along axis 6 and is fastened at a respective end to hubs 8 and 10 using any known mounting means for such tubular lamps. Current is provided to lamp 22 by means of a conductor 24 which extends through a bore 26 provided in hub 10. Preferably, lamp 22 is an isotopically enriched and filtered fluorescent lamp which when activated emits radiation such as, for example, primary $^{196}$Hg radiation.

Means is mounted within chamber 4 for collecting the scavenger compound which includes the specific isotope obtained by spinning the desired gas at a high speed in the presence of radiation as discussed herein. In the embodiment of FIG. 1 such collecting means is positioned between the outer periphery of the chamber and the lamp and includes at least one recombination member. Without limitation, examples of such a recombination member include elongated rods, a wire cylindrical mesh, and the like. In the embodiment of FIG. 1, the recombination member is in the form of recombination rods 28. Two recombination rods 28 are depicted in FIG. 1, although a plurality of rods circumferentially spaced and extending about axis 6 is preferred. Use of recombination rods is known in the art and will not be described herein, except to note that the radicals formed during the process described herein will recombine with other species on the surface of each rod or other recombination member to stabilize them or otherwise conserve momentum. In this manner a collection of the scavenger compound which includes the desired specific isotope is formed for subsequent removal. Rods 28 are spaced from lamp 22 and extend along respective axes which are parallel to axis 6. The rods 28 are coupled to hubs 8 and 10 using any means which will hold the rods in place during operation of the separator 2.

Rods 28 spaced from lamp 22 are particularly useful in collecting lighter isotopes, since it is the lighter isotopes which will tend to be suspended in an area between inner surface 30 of the periphery of the chamber and the lamp during operation of the separator 2.

Figure 2:
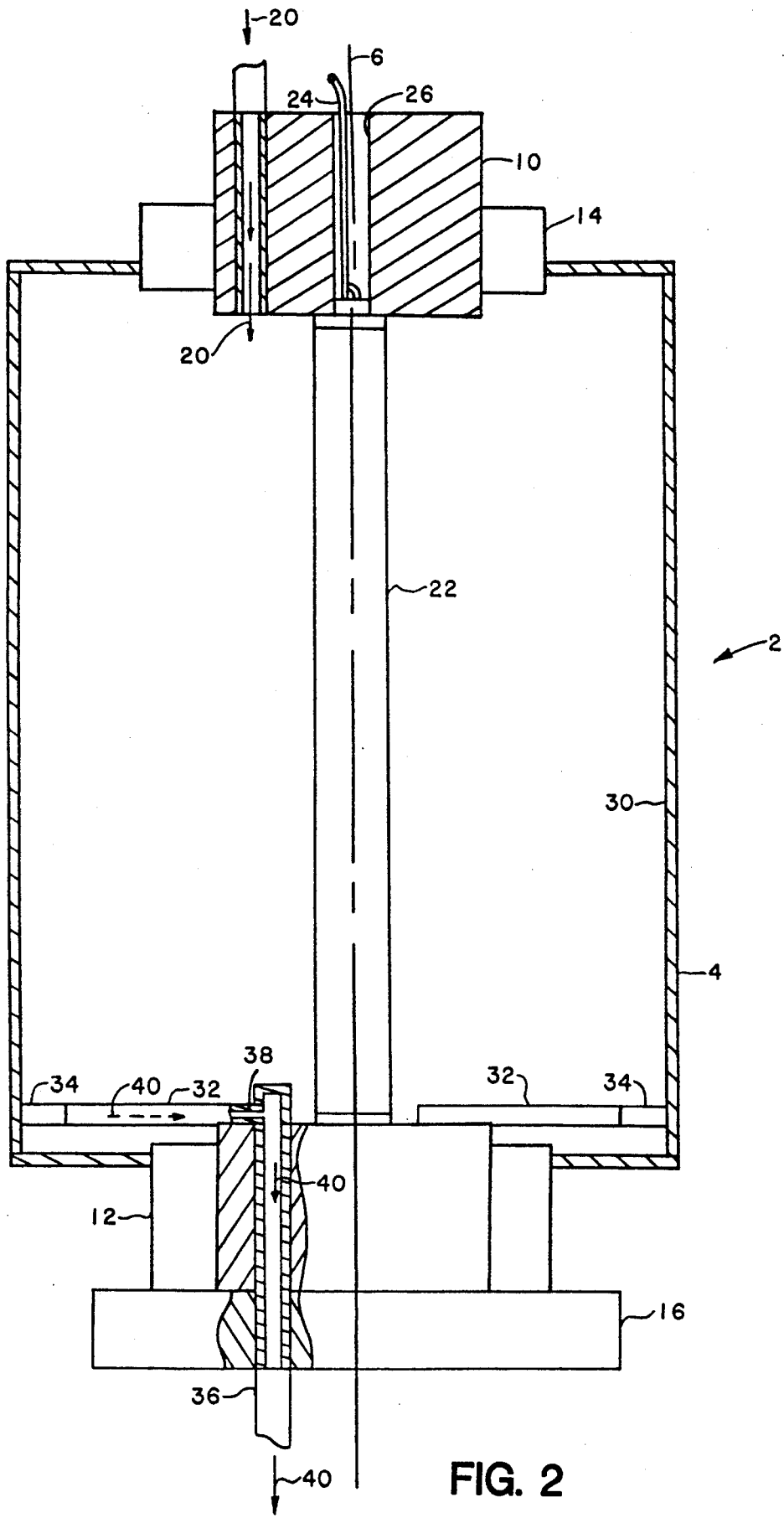
FIG. 2 is an elevational view of an alternative embodiment of photochemical isotope separator of the present invention.

In those instances where it is desired to collect heavier isotopes which tend to be spun outward to the inside wall of the periphery of the chamber during the spinning thereof and then fall towards the bottom of the chamber, the apparatus depicted in FIG. 2 is provided. FIG. 2 depicts separator identical to the separator of FIG. 1, similar structure having the same reference numbers, with the exception that recombination rods 28 have been replaced with collecting means positioned adjacent to an inner wall 30 of the chamber 2. In particular, in the embodiment of FIG. 2, the collecting means is in the form of at least one scooping member 32. The centrifuge discussed in the Olander article referred to herein describes such scooping members and such members will not be discussed further herein except to note that the scooping members 32 are hollow and include nozzle-like scoops 34 at the end thereof adjacent inner wall 30. Scoops 34 scoop-up the heavier isotope containing compounds which have been flung towards inner wall 30, by the centrifugal force effected as the chamber 4 is caused to spin, and then fall to the bottom of the chamber. In essence, the heavier isotopes lying against wall 30 are scraped therefrom by scoops 34. As is known in the art, the isotopes can also be caused to flow towards the top of the chamber 4 in which case scoops can be positioned accordingly. Alternatively, elongated scoops extending in the vertical direction of axis 6 from the upper wall to the lower wall of the chamber 4 can be positioned against the inside wall 30 to scoop or otherwise scrape isotopes from the entire extent of the wall 30.

Means can be provided to remove the collected scavenger compound which includes the specific isotope from the chamber 4. For example, in the embodiment of FIG. 2 a conduit 36 is provided which connects with the bore 38 extending through the hollow scooping member 32, so that as the heavier isotopes are collected by the scoops 34, such heavier isotopes are caused to flow in the direction of arrows 40 through bore 38 and out of the chamber 4 by means of conduit 36 for collection as desired.

In the method of the present invention, and referring to FIG. 1, a suitable gas from which the specific isotope is to be isolated is caused to flow from a source (not shown) through conduit 8 and into the rotatable chamber 4. For example, if it is desired to ultimately collect $^{196}$Hg as $^{196}$HgCl$_2$, a gaseous mixture of hydrochloric acid and natural mercury is inputted through conduit 18 into chamber 4. Chamber 4 and the gaseous mixture therein is spun at a very high speed by the electromagnetic motor 16, thereby causing the heavier isotopes to be projected towards the inner wall 30 of the periphery of the chamber and the lighter isotopes to be maintained in an area between inner wall 30 and the lamp 22. During the spinning of the gaseous mixture, it is radiated with a wave length or frequency characteristic of the absorption of a particular isotope of the atomic or molecular mixture. To this end, an isotopically selective lamp is used, such as an isotopically enriched and filtered fluorescent lamp which emits radiation such as primary $^{196}$Hg radiation. The manner in which collecting of the specific isotope from the spinning and radiated gas is effected depends upon whether it is desired to collect the lighter or heavier isotope. If collecting the lighter isotope, such collecting is done as noted above in an area between the inner wall 30 and the lamp 22. In collecting the heavier isotope, such collecting is done as noted above by scooping the specific isotope at the inner wall 30 of the chamber 4. The collected isotope can be removed from chamber 30 in several ways. For example, as described above, removing can be effected by causing the scooped isotopes to flow through bore 38 and conduit 36 of FIG. 2 to a suitable receiver. Alternatively, if recombination rods are used, or if some other recombination member is used such as, for example, a cylindrical wire mesh which extends circumferentially about axis 6 and lamp 22, the isotopes can be removed in a known manner by first removing the recombination rods or mesh or the like, as the case may be, from the chamber 4, and then cleaning such recombination member(s) by, for example, submerging into an electrolyte to remove the specifically collected isotopes from the surface of the recombination member. Without intending to be bound by a theory of operation, and considering by way of example only the enrichment of $^{196}$Hg by flowing a gaseous mixture of natural Hg and HCl into a chamber 4, in the process of the present invention the heavy isotopes will be concentrated next to the inner wall of the chamber and the lighter isotopes will be somewhat away from the inner wall. To increase the enrichment of $^{196}$Hg, the pressure of the Hg can be increased in a known manner to the level where $^{196}$Hg becomes optically thick, and this can be done without concern that other isotopes might also be excited, thereby causing scrambling due to energy transfer. Such concern can be dismissed, since due to the light weight of HCl, the HCl will be in the vicinity of $^{196}$Hg, rather than in the vicinity of the heavy isotopes such as $^{200}$Hg. Therefore, it is likely that a reaction will take place with excited $^{196}$Hg to form a $^{196}$Hg-containing scavenger compound. Once $^{196}$HgCl$_2$ is formed, it can be scooped where formed, as for example, by means of a recombination surface such as provided by rods 28 as discussed herein, rather than letting it flow to the inner wall 30. It is desired to prevent such flowing to the inner wall 30, since the vicinity of the inner wall is full of Hg enriched in the heavy isotopes, and flowing of the $^{196}$HgCl$_2$ to the inner wall will cause loss of the enrichment reaction.

Examples of preferred scavengers for use in the present invention include, but are not limited to, HCl and O$_2$.

In using the method and apparatus of the present invention, it is possible to obtain a single isotope from a distribution of isotopes that are enriched. It is possible to do so by using a photochemical isotope separator without causing anywhere in the apparatus a buildup of enriched material which might impede radiation. The entire reaction can be accomplished in a single chamber, since there is no need to separate the chemicals from the lamp or other source of radiation. By keeping the lamp clean, the separator can be operated for an extended length of time and yet yield selectively a desired enrichment in a given isotope. In essence, the apparatus and method of the present invention make use of the advantages of photon selectivity of the photochemical and spatial selectivity of the centrifuge system, thereby significantly enhancing the isotope enrichment process while enabling the system to operate for long periods of time.

The embodiments which have been described herein are but some of several which utilize this invention and are set forth here by way of illustration, but not of limitation. It is apparent that many other embodiments which will be readily apparent to those skilled in the art may be made without departing materially from the spirit and scope of this invention.

What is claimed is:

1. A method of yielding selectively a desired enrichment in a specific isotope comprising the steps of:
    inputting into a rotatable chamber a gas comprising a gaseous mixture including said specific isotope and a scavenger from which said specific isotope is to be isolated;
    spinning said chamber and said gas therein;
    radiating said spinning gas with a wave length or frequency characteristic of the absorption of a particular isotope of the atomic or molecular gas, thereby inducing a chemical reaction between said specific isotope and scavenger to form a scavenger compound; and
    collecting the scavenger compound which includes the specific isotope from said spinning and radiated gas.

2. The method of claim 1 wherein said radiating step includes radiating from an isotopically selected lamp.

3. The method of claim 2 wherein said collecting step includes collecting said specific isotope in an area between said lamp and an inner wall of the periphery of said rotatable chamber.

4. The method of claim 1 wherein said collecting step includes scraping said specific isotope off an inner wall of the periphery of said rotatable chamber.

5. The method of claim 1 wherein said inputting step includes inputting a gaseous mixture of natural mercury and a scavenger comprising hydrochloric acid.

6. The method of claim 5 wherein said radiating step includes radiating said spinning gas from an isotopically enriched and filtered fluorescent lamp emitting radiation.

7. The method of claim 6 wherein said lamp is emitting primarily $^{196}$Hg radiation.

8. The method of claim 1 further including the step of removing the collected isotope from said chamber.

9. The method of claim 7 wherein said collecting step includes collecting said specific isotope in an area between said lamp and an inner wall of the periphery of said rotatable chamber.

10. The method of claim 7 wherein said collecting step includes scraping said specific isotope off an inner wall of the periphery of said rotatable chamber.

11. A photochemical isotope separator for yielding selectively a desired enrichment in a specific isotope, comprising:
    a chamber which is rotatable about a longitudinal axis;
    means coupled to said chamber for spinning said chamber about said longitudinal axis;
    means associated with said chamber for flowing gas into said chamber;
    means mounted within said chamber for radiating said spinning gas with a wave length or frequency characteristic of the absorption of a particular isotope of the atomic or molecular gas; and
    means mounted within said chamber for collecting specific isotope.

12. The photochemical isotope separator of claim 11 wherein said radiating means includes a lamp which is isotopically selective.

13. The photochemical isotope separator of claim 12 wherein said lamp is elongated and extends along a longitudinal axis.

14. The photochemical isotope separator of claim 11 wherein said chamber is cylindrical.

15. The photochemical isotope separator of claim 13 wherein said collecting means is positioned in an area between said lamp and an inner wall of the periphery of said rotatable chamber.

16. The photochemical isotope separator of claim 15 wherein said collecting means includes at least one recombination member.

17. The photochemical isotope separator of claim 11 wherein said collecting means is positioned adjacent an inner wall of the periphery of said rotatable chamber.

18. The photochemical isotope separator of claim 17 wherein said collecting means includes at least one scooping member.

19. The photochemical isotope separator of claim 18 further including means associated with said at least one scooping member for removing said specific isotope from said chamber.

20. The photochemical isotope separator of claim 11 further including means associated with said collecting means for removing said specific isotope from said chamber.

21. The photochemical isotope separator of claim 12 wherein said lamp is an isotopically enriched and filtered fluorescent lamp which emits radiation.

22. The photochemical isotope separator of claim 21 wherein said lamp emits primary $^{196}$Hg radiation.